United States Patent [19]

Caplan

[11] 3,906,927

[45]*Sept. 23, 1975

[54] SOLAR-THERMAL POWER SYSTEM EMPLOYING ADJUSTABLE CURVATURE REFLECTIVE PANELS AND METHOD OF ADJUSTING REFLECTIVE PANEL CURVATURE

[76] Inventor: Harry W. Caplan, 3397 E. Monmouth Rd., Cleveland Heights, Ohio 44118

[ * ] Notice: The portion of the term of this patent subsequent to Oct. 15, 1991, has been disclaimed.

[22] Filed: Dec. 12, 1973

[21] Appl. No.: 423,979

Related U.S. Application Data

[63] Continuation-in-part of Ser. No. 407,943, Oct. 19, 1973, Pat. No. 3,841,738.

[52] U.S. Cl. .................. 126/270; 60/641; 350/295; 350/299; 350/310
[51] Int. Cl.² ............................................ F24J 3/02
[58] Field of Search ................ 126/270, 271; 60/26; 350/295 X, 299 X, 310 X, 293, 294, 288

[56] References Cited
UNITED STATES PATENTS

| | | | |
|---|---|---|---|
| 412,724 | 10/1889 | Calver | 126/270 |
| 503,004 | 8/1893 | Severy | 126/270 |
| 811,274 | 1/1906 | Carter | 126/271 |
| 1,951,404 | 3/1934 | Goddard | 126/270 |
| 2,707,903 | 5/1955 | Trombe | 126/270 X |
| 2,987,961 | 6/1961 | Cotton et al. | 126/270 X |
| 3,009,391 | 11/1961 | Zagieboylo et al. | 126/270 X |
| 3,023,753 | 3/1962 | Wheless | 126/270 X |
| 3,286,270 | 11/1966 | Kelly | 350/295 X |
| 3,841,738 | 10/1974 | Caplan | 126/271 |

*Primary Examiner*—William F. O'Dea
*Assistant Examiner*—Peter D. Ferguson
*Attorney, Agent, or Firm*—Watts, Hoffmann, Fisher & Heinke Co.

[57] ABSTRACT

Reflective panels for solar-thermal power systems are supported by an adjustable mounting system capable of deforming the panels to fine-tune their focus on a collector. The panels are formed from strips and sheets of paper adhered together to define a relatively rigid honeycomb support which carries a reflective material. The adjustable mounting system includes threaded rods extending through the panels. Apertured gusset plates receive the rods on opposite sides of the panels and nuts threaded onto the rods clamp the panels securely between the gusset plates. The nuts are positioned as required to deform the panels and effect a desired curvature of the reflective material.

29 Claims, 7 Drawing Figures

SOLAR-THERMAL POWER SYSTEM EMPLOYING ADJUSTABLE CURVATURE REFLECTIVE PANELS AND METHOD OF ADJUSTING REFLECTIVE PANEL CURVATURE

CROSS REFERENCE TO RELATED APPLICATION

The present application is a continuation-in-part of application Ser. No. 407,943 filed Oct. 19, 1973, and now U.S. Pat. No. 3,841,738, here the "Terrestrial Panel Patent," the disclosure of which is incorporated herein by reference.

BACKGROUND OF THE INVENTION

1. Field of the Invention

The present invention relates generally to solar-thermal power systems, and more particularly to novel and improved, lightweight and economical, reflective panels for use in such systems, together with methods of adjusting the curvature of the panels.

2. Prior Art

Terrestrial solar-thermal energy plants have been proposed employing vast arrays of concave, trough-like reflectors for concentrating solar energy toward fluid carrying conduits positioned above the reflective surfaces along their focal axes. One such power plant is described in the referenced Terrestrial Panel Patent.

One problem with such a terrestrial system is that it is capable of generating only relatively low temperature steam. Another problem is the vast expanse of fluid carrying conduits required to interconnect the collector panels with a turbine-electric generating system. Still another problem is that the reflective panels face upwardly and as such are subject to breakage by falling hail.

In order to overcome these and other drawbacks, solar-thermal power plants have been proposed which include arrays of curved, movable mirror panels called "heliostats" to concentrate the sun's rays continuously in fixed directions toward a single collector. The collector typically includes a heat exchanger system which utilizes the concentrated solar energy to generate superheated steam. The steam, in turn, drives a turbine which runs an electrical generator.

Heliostat systems are capable of generating relatively high temperature steam. They have the advantage that no fluid carrying conduits need be associated with each of the reflector panels. Moreover, the heliostats themselves can be yoke-supported for movement and arranged to turn downwardly automatically in response to high wind velocities such as typically accompany hail storms.

The movement of the heliostats required to maintain their focus on the collector as the sun assumes different positions in the sky is preferably automatically controlled. Each heliostat preferably has a sensor positioned between it and the collector to assure that the heliostat is optimally positioned at all times for concentrating solar energy on the collector.

Heliostat solar-thermal energy systems of this type are described in a publication entitled "Solar Power Conversion System and Applications: Presentation to Western Systems Coordinating Counsel, Albuquerque, N.M., September 24–25, 1973," by Floyd A. Blake, Manager Solar Power Programs, Martin Marietta Aerospace, Denver Division, Denver, Colo. 80201.

One problem with heliostat solar-thermal power systems is that the curvature of the heliostat reflectors must be quite accurate if the heliostats are to properly concentrate the sun's rays on the collector. The need for surface curvature accuracy has, in known and proposed systems, meant that the reflector panel and its support are structurally reinforced, accurately machined assemblies which are expensive to form and install.

Another problem is that heliostats which are located at different distances from the collector must have different curvatures to properly focus on the collector. Moreover, the curvature of each heliostat reflector should be adjustable, at least to some limited degree, to permit fine tuning of its focus. The need for different reflector curvatures together with a fine tuning capability have also added significantly to the cost of known and proposed heliostat systems.

One proposed approach to providing a tunable reflective surface on a heliostat has been to form the entire reflective surface of the heliostat from a single square sheet of mirrored glass. The square sheet is then supported at eight points around its periphery (at each of four corners and each of four points intermediate the corners) and at one central point. The central point support includes a vacuum adjustable member capable of drawing the mirror into a desired curvature.

Such a proposed tuning system has a number of disadvantages. First, it requires that the reflective surface be formed from a single, continuous, expensive piece of mirrored glass. Second, if the mirror is broken at any location, the stresses developed when it is deformed to the desired corvature will cause it to fail in other places thereby requiring its complete replacement. Third, the nine-point support leaves the sheet unsupported and unreinforced at all other locations across its surface, which permits the mirror to be easily broken.

In summary, while heliostat solar-thermal power plants have been proposed, the problem of providing relatively inexpensive heliostat structures has remained unsolved and has stood as a barrier to the widespread acceptance of this essentially pollution-free approach to power generation.

SUMMARY OF THE INVENTION

The present invention overcomes the foregoing and other drawbacks of the prior art, and provides adjustable curvature reflectors which are light in weight, simple and inexpensive to build, and easy to install and fine tune.

In the preferred embodiment of the invention, the reflectors include strips of mirrored glass adhered to a paper honeycomb panel. An adjustable mounting system is provided which deforms the panel as needed to fine tune the curvature of the reflective surface. The mirror strips are fully supported along their lengths and are not subject to breakage during tuning.

Paper honeycomb panels of the preferred type are described in the referenced Terrestrial Panel Patent, together with continuous processes for forming such panels. In particular, the panels have a core which is preferably formed from strips of paper positioned in side-by-side relationship and adhered together at spaced intervals to define an array of open ended cells. A pair of paper facing sheets are adhered to the top and bottom surfaces of the core and serve to close opposite ends of the honeycomb cells. Edge regions of the facing sheets are preferably folded around the sides of the honeycomb core and adhered in overlapping relationship to seal the core region. A waterproofing material is applied to the outer surfaces of the honeycomb panel, and a reflective material is applied to the top surface of the panel.

The preferred reflecting material is mirrored glass. It has been found that strips of mirrored glass can be purchased quite inexpensively from a number of mirror companies. Mirror companies apparently stock a limited number of sizes of mirrored glass, and cut strips of about 1 to 3 inch widths off these stocks sizes to fill special orders for non-standard mirror sizes. The panels of the present invention are quite well adapted for use with these scrap strips of mirrored glass. A suitable heavy body waterproof mastic adhesive such as that sold by the 3M Company under the designation EC 896 is used to secure the mirror strips permanently to the parabolic supporting surface of the panel.

While other types of reflective surfaces can also be used, glass mirrors have several advantages. In the first place, they are rigid and do not require perfectly smooth supporting surfaces such as are required by reflective metallic foils. Moreover, glass mirrored surfaces have a relatively long life as compared with reflective foils and reflective plastic materials in that they are not subject to thermal deterioration and they are cleanable repetitively without adverse effect. When mounted on the honeycomb panel supporting structures of the present invention, the glass mirrors are bendable as required to fine tune or adjust the curvature of the panel. As such, the glass mirror honeycomb panel combination provides a relatively inexpensive low production tolerance system for forming heliostat reflectors.

In accordance with another feature of the present invention, an adjustable mounting system is provided to permit fine tuning of the panel focus. A heliostat yoke structure is formed from lengths of tubing which are welded together to define spaced support members. Threaded rods carried by the support members extend through the honeycomb panels. Nuts threaded onto the rods on opposite sides of the panels provide a means for adjusting the curvature of the panels to fine tune them for the required focus.

In accordance with another feature of the invention, a method of adjusting the curvature of a reflective panel is provided which includes deforming the panel structure by moving portions of it toward and away from its support structure through the use of an adjustable mounting system including threaded rods as described.

As will be apparent from the foregoing summary, it is a general object of the present invention to provide novel and improved lightweight and inexpensive reflective panels and panel support systems for solar-thermal power systems, together with improved methods for adjusting the curvature of such reflectors.

Other objects and a fuller understanding of the invention may be had by referring to the following description and claims taken in conjunction with the accompanying drawings.

DESCRIPTION OF THE PREFERRED EMBODIMENT

Figure 1:
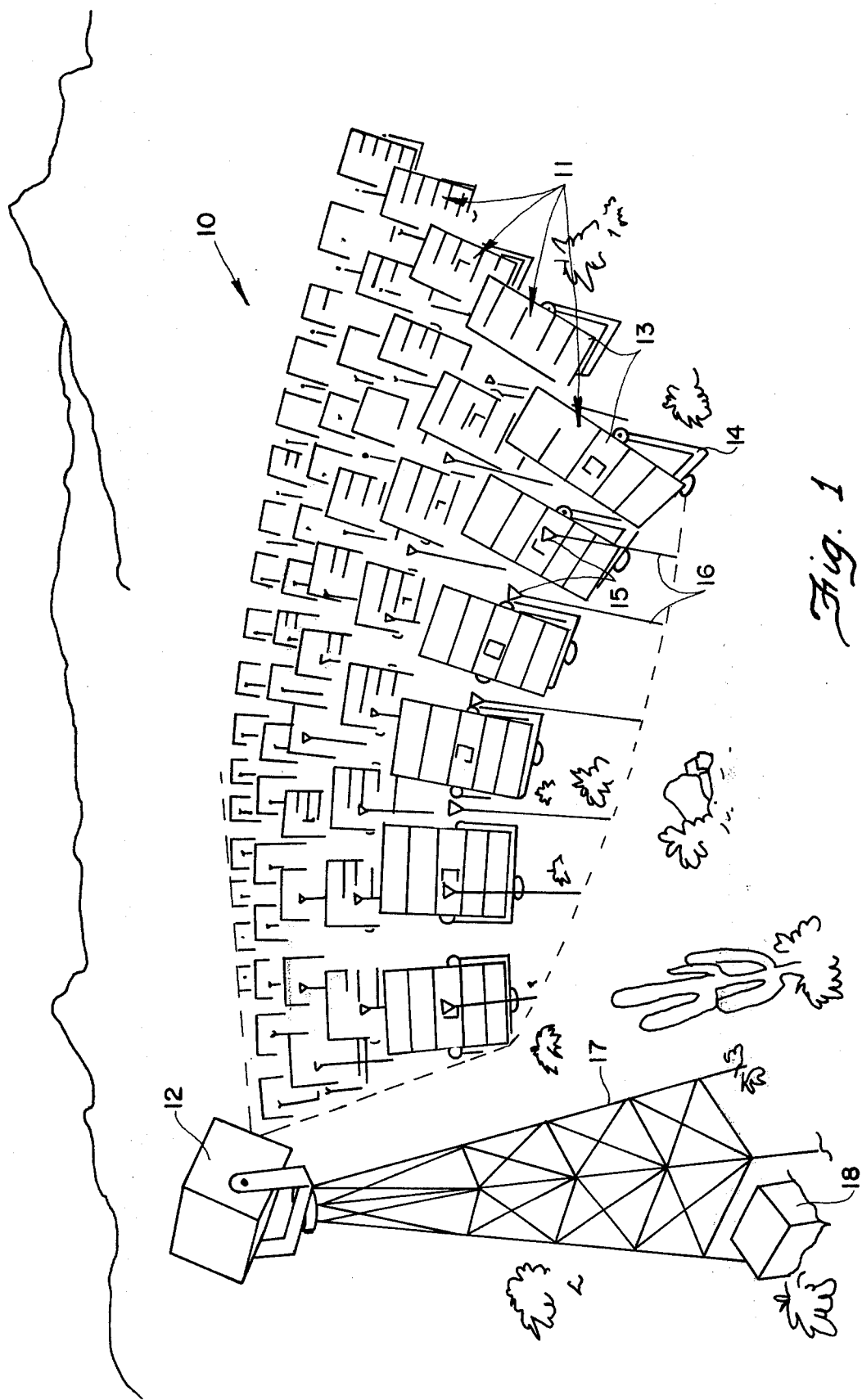
FIG. 1 is a perspective view of a heliostat solar-thermal power plant.
Figure 2:
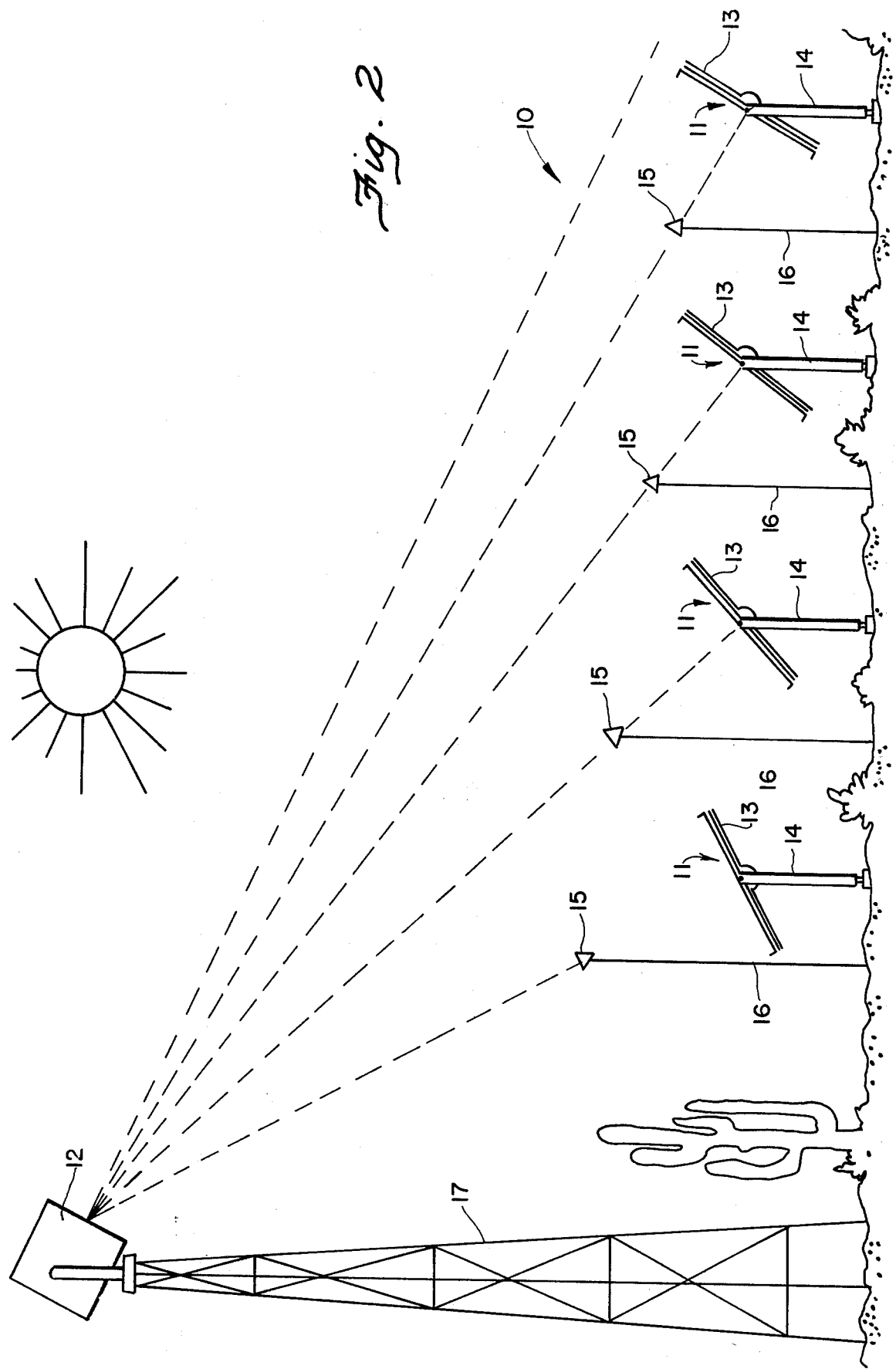
FIG. 2 is a schematic side-elevational view of the power plant of FIG. 1, illustrating the arrangement of the heliostats.

Referring to FIGS. 1 and 2, a heliostat solar-thermal power system is illustrated generally by the numeral 10. The system 10 is of known configuration and typically includes a fan-shaped array of heliostats 11 disposed acorss a ground surface for concentrating the sun's rays on a collector 12.

The heliostat 11 includes reflectors 13 movably supported on yoke structures 14. Reflector movement is motor powered and operates automatically to keep the reflectors 13 properly aligned to direct the sun's rays toward the collector 12 as the sun assumes different positions in the sky. Sensors 15 mounted on posts 16 in front on the heliostats 11 control the movement of the heliostats to maintain the required focus.

The collector 12 is mounted atop a tower 17. Tower-mounting of the collector 12 enables the heliostats 11 to be located on a relatively flat ground surface. The collector 12 typically includes a heat exchanger system which utilizes the concentrated solar energy to superheat steam. The steam is then ducted to a turbine-electric generator which may be housed in building 18 at the base of the tower 17.

The Blake publication, referenced above, describes known and proposed solar-thermal power systems of the general type illustrated in FIG. 1. By way of example the publication describes an existing heliostat system employing an overhead collector constructed by Dr. G. Francis, of the University of Genoa at St. Ilario-Nervi, Genoa, Italy. Such a plant is said to have generated 500° C. superheated steam at 150 atmospheres pressure (2205 PSI).

Figure 3:
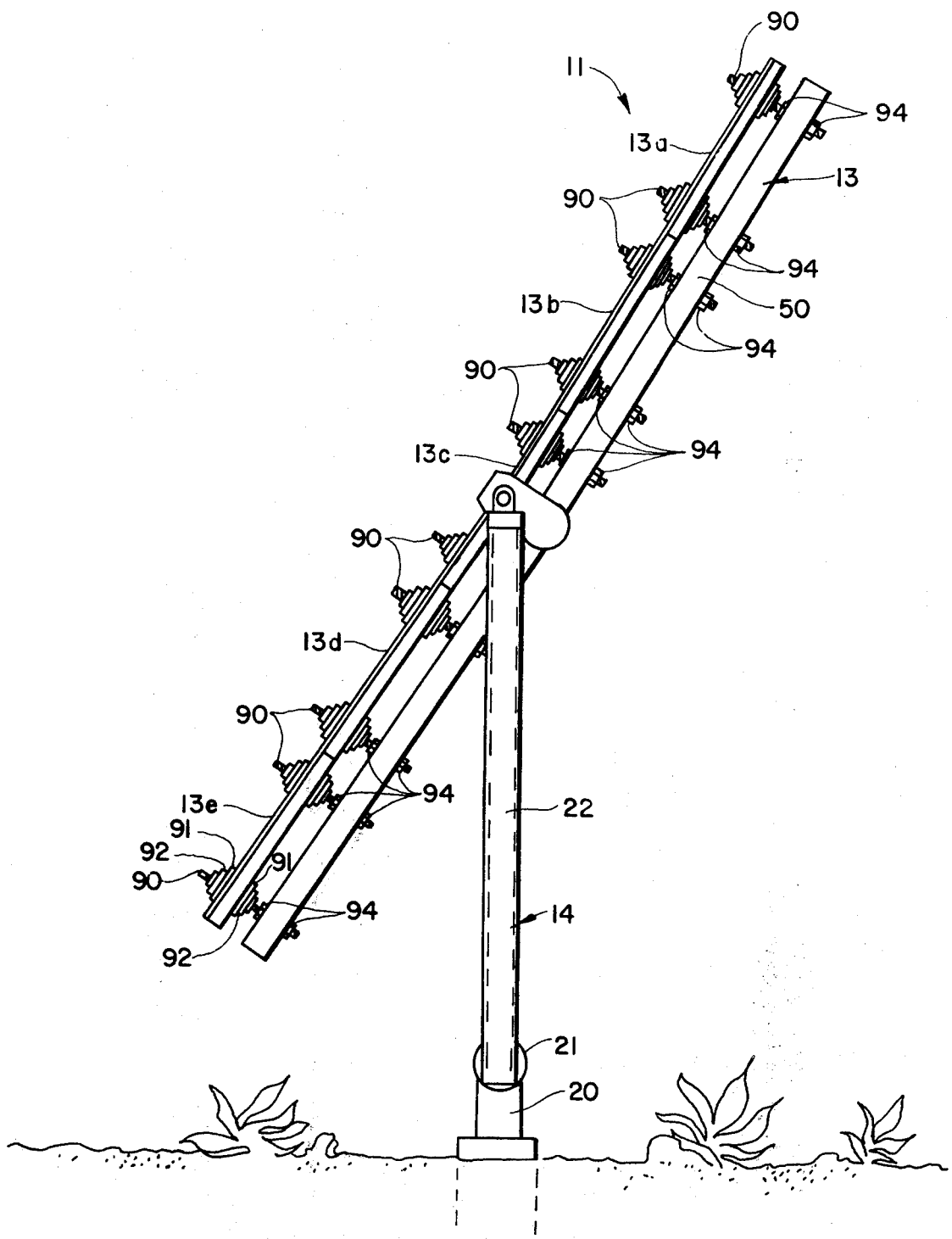
FIG. 3 is a side-elevational view of one of the heliostats.
Figure 4:
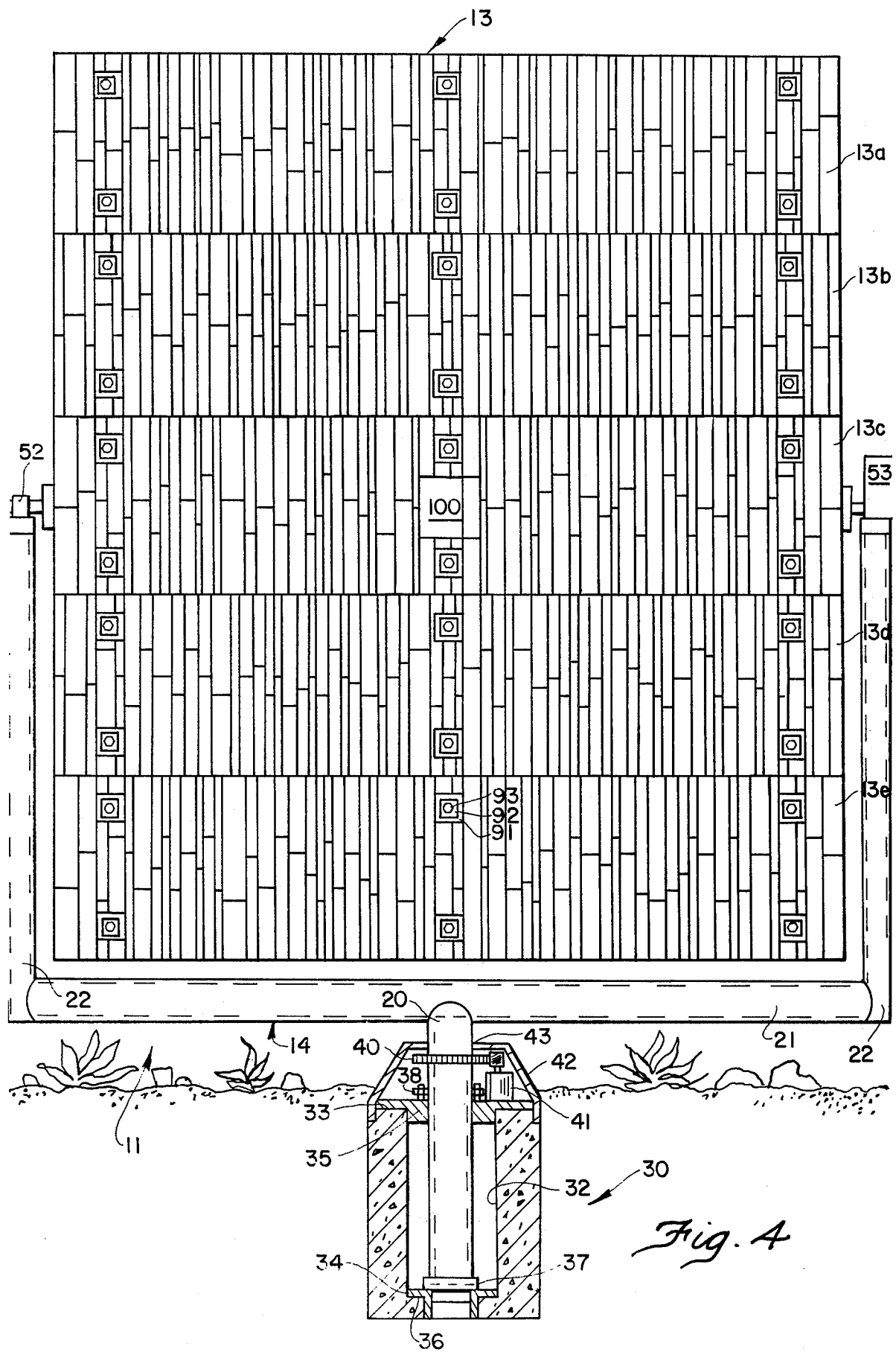
FIGS. 4 and 5 are front and rear elevational views, respectively, of the heliostat of FIG. 3 with the reflective panel oriented vertically.
Figure 5:
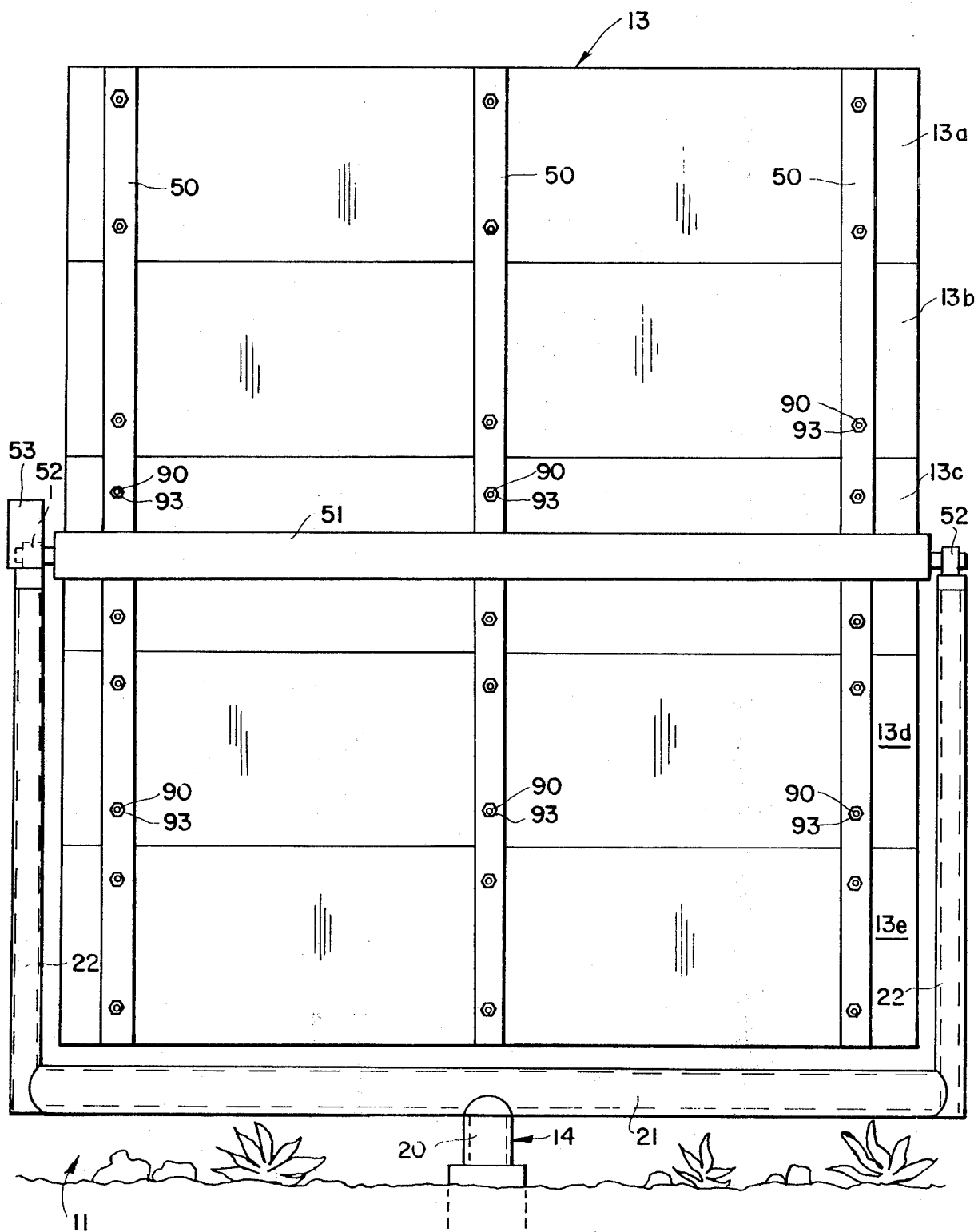

In accordance with one aspect of the present invention, an improved heliostat structure 11 is provided for use in the system 10. Referring to FIGS. 3–5, the supporting yoke structure 14 includes a welded yoke formed from lengths of galvanized pipe. An upstanding base member 20 is welded centrally to a cross member 21. Opposite ends of the cross member 21 are welded to upstanding arms 22.

Referring to FIG. 4, an underground bearing unit, generally indicated by the numeral 30, journals the upstanding yoke member 20 for rotation. The bearing unit 30 typically includes a reinforced pre-cast concrete cylinder 31. A stepped cylindrical bore 32 is defined within the cylinder 31 and includes upwarding facing shoulders 33, 34. Annular bearing plates 35, 36 are positioned on the shoulders 33, 34, respectively. A cap 37 carried on the lower end of the yoke member 20 is received by the lower bearing plate 36 to provide a rotary connection therebetween. Rollers 38 rotatably carried by the upper bearing plate 35 engage the sides of the yoke member 20 to provide a rotary connection between the upper bearing plate 35 and the yoke member 20.

A toothed gear 40 secured to the yoke member 20 is driven by a motor 41 secured to the upper bearing plate 35. Operation of the motor 41 is controlled by the sensor 15 to maintain alignment of the reflector 13 with the collector 12. A cover shroud 42 closes the open upper end of the cylinder 31. A seal 43 carried by the shroud 42 engages the yoke member 20 and prevents the entry of moisture and other foreign matter into the cylinder bore 32.

Referring to FIG. 5, the reflector panel 13 includes a plurality of individual panels 13a–13e which extend in side-by-side relationship to form a substantially continuous surface. The panels 13a–13e are carried by three upright members 50. A cross member 51 rigidly connects with the uprights 50 and has opposite end regions journaled by bearings 52 carried on the uprights 22. A drive motor 53 provided adjacent one of the bearing connections 52 serves to rotate the reflector 13 under the control of the sensor 15 to maintain proper alignment of the reflector 13.

Figure 6:
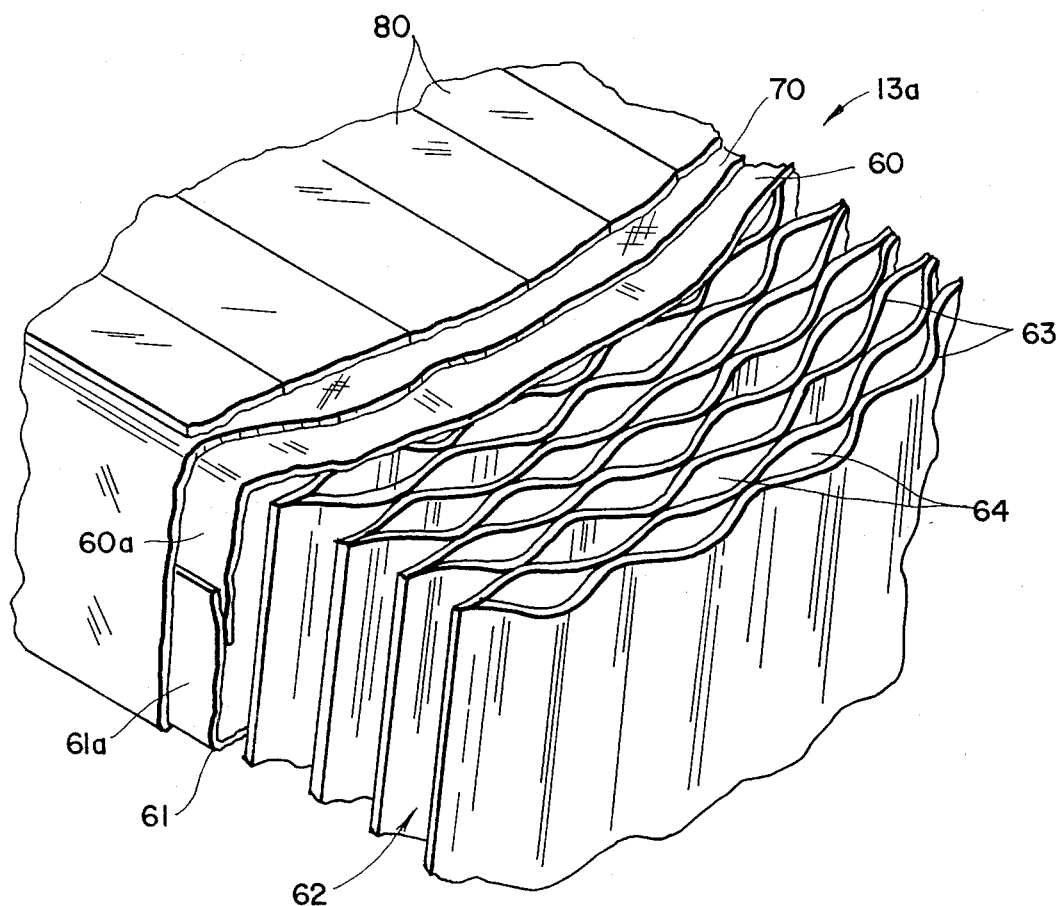
FIG. 6 is an enlarged perspective view of a portion of the reflective panel; and, FIG. 7 is an enlarged cross-sectional view illustrating the adjustable mounting of the reflective panels.

The panels 13a–13e are of the type described in the referenced Terrestrial Panel Patent. More specifically, as shown in FIG. 6, the panel 13a includes relatively thick facing sheets 60, 61 of virgin kraft paper. The sheets 60, 61 preferably have a thickness within the range of about 0.015 to about 0.035 inches with the preferred thickness being about 0.025. A honeycomb core 62 formed from corrugated strips 63 of virgin kraft paper is interposed between the facing sheets 60, 61. The corrugated strips 63 preferably have a thickness within the range of about 0.005 to about 0.015 inches, with a preferred thickness being about 0.008.

The strips 63 are preferably of a width within the range of about 3 to 6 inches, the most preferred width being about 4 inches. The corrugations formed in the strips 63 are preferably of such size and shape as will permit adjacent strips to be adhered together to form an array of tubular cells 64, each having a cross-sectional area of about 1 square inch. The preferred relationship between the width of the strips 63, i.e., the length $L$ of the cells 64, and the cross-sectional area $A$ of the cells, is for the cell length $L$ to be within the range of about 2 to 10 times the square root of the cell area $A$ the more preferred range being about 3 to 7, and the most preferred multiplication factor being about 4.

Edge portions of the facing sheets 60, 61 can be folded around the sides of the core structure as shown at 60a, 61a, and adhered in overlapping relationship to define a seal core region.

The adhesive used to secure the core strip 63 together and to secure the facing strips 60, 61 to the core strips 63 can be any of a number of water base adhesives such as that sold by Swift Chemical and Adhesive Company under the designation 4252 or that sold by National Starch Company and the designation Durlock 42-2150. Alternatively, any of a variety of polyester resin adhesives which are water resistant can be used, such as that sold by Marco Manufacturing Company under the designation G4 455.

The exterior surfaces of the panels 13a–13e are coated with waterproofing material. The preferred coating material is a polyester resin which not only serves to waterproof the panel but which also contributes to the strength and rigidity of the panel. Alternatively, sheets of plastic can be adhered around the outer panels surfaces to prevent water penetration.

In some installations, as where high winds are frequently encountered, it is desirable to further reinforce the panels 13a–13e by adhering one or more glass fiber sheets 70 over the outer panel surfaces. The glass fiber sheets 70 are preferably adhered in place by the same polyester resin used to waterproof the panels.

The reflective surfaces of the panels 13a–13e are preferably formed from strips of mirrored glass 80 adhered in place. The adhesive used to adhere the strips 80 should be waterproof and should be selected to be effective with the type of reflective material being used. An acceptable adhesive is a heavy body mastic sold by 3M Company under the designation EC 896. The mirrored strips 80 are preferably about 2 inches in width and are positioned side-by-side to extend transversely of the panels 13a–13e. As will be apparent, reflective materials other than mirrored glass can also be adhered directly to the panel in place of mirrored glass strips.

Corrugated honeycomb cores including strips 63, both with and without cover sheets, 60, 61 can be bought commercially from the Union Camp Paper Company. Wayne, New Jersey. The panels 13a, 13e are typically of about 4 feet in width and with five panels 13a–13e secured side-by-side form a reflector 13 of about 16 feet in width and 20 feet in height.

Figure 7:
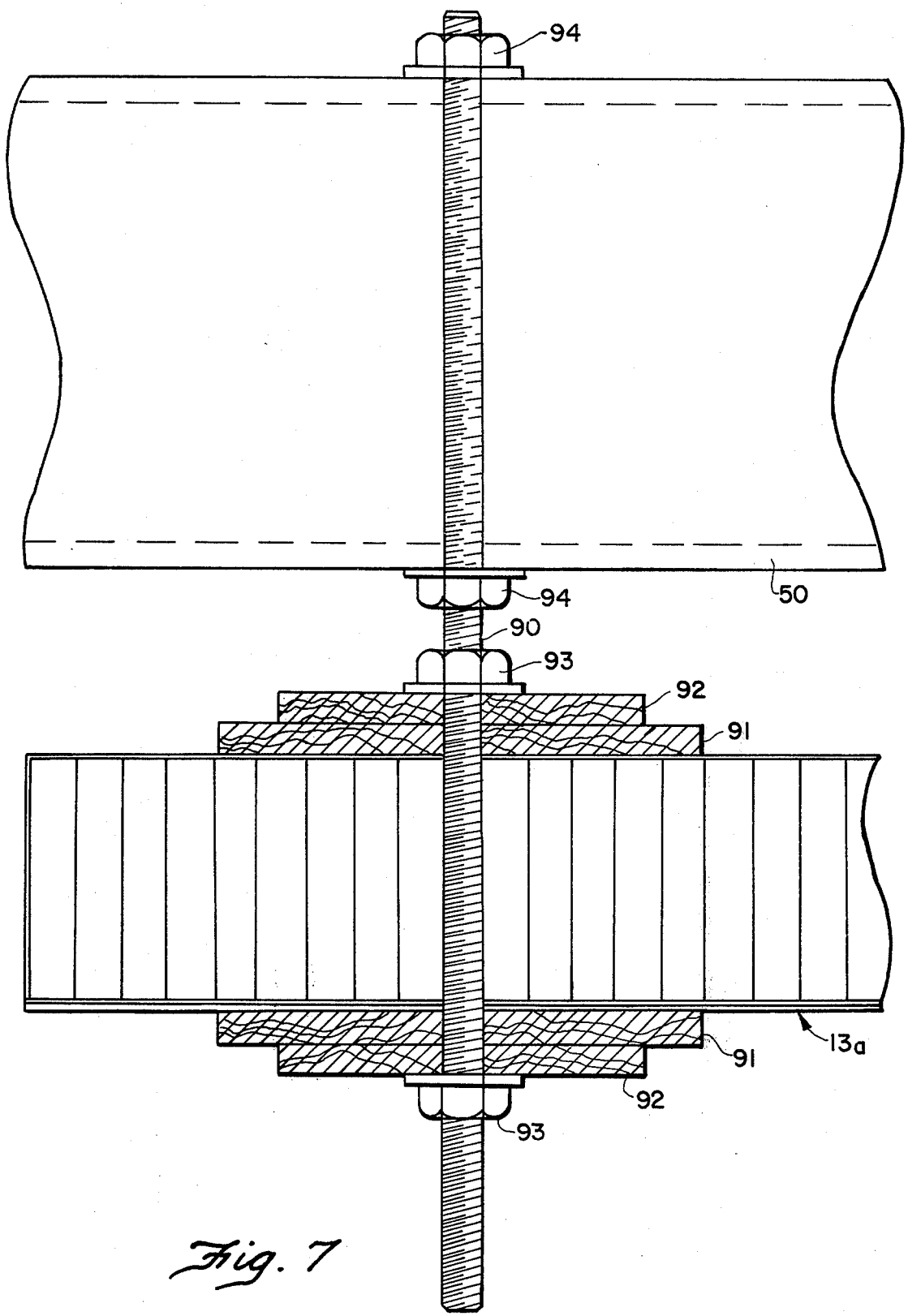

Referring to FIGS. 3 and 7, an adjustable mounting system is provided for securing the panels 13a–13e to the support members 50. In the preferred embodiment, the mounting system includes a plurality of threaded rods 90 which extend through aligned apertures in the panels 13a–13e and the support members 50. Apertured plywood gusset plates 91, 92 positioned on opposite sides of the panels 13a–13e receive the threaded rod. Nuts 93 clamp the gusset plates 91, 92 securely against the panels 13a–13e. In similar fashion, nuts 94 secure the threaded rod 90 on opposite sides of the support members 50.

By adjusting either the nuts 93 or the nuts 94, the panels 13a–13e can be moved toward and away from the support members 50 for proper positioning. Fine tuning of the reflector surface curvature is achieved without difficulty by adjusting the nuts 93, 94 to deform or bend the panels 13a–13e.

Installation of the heliostats 11 is preferably performed in several distinct steps. First, the bearing assemblies 30 are secured in place. Next the yoke structures 14 are mounted in the bearing assemblies 30. Third, the panels 13a–13e are put in place and the nuts 93, 94 tightened to provide a roughly accurate panel curvature. Lastly, the nuts 93, 94 are adjusted as need be to effect fine tuning of the panel focus.

Referring to FIG. 4, a square control mirror 100 is provided centrally of the panel 13c. In mounting the panels 13a–13e on the yoke structure 14, care must be taken to assure that the center of the control mirror 100 lies at the juncture of the axis of rotation of the yoke member 20 as defined by the bearing assembly 30, and the axis of rotation of the panel 13 as defined by the bearings 52. This mounting arrangement assures that the reflective center of the control mirror 100 will not change position regardless of the orientation of the reflective panel 13.

As described above, each heliostat has a sensor 15 positioned between it and the collector 12. The sensors 15 are located along imaginary lines extending from the centers of the control mirrors 100 to the collector 12.

Sensor controls of this type are known, as described in the referenced Blake publication.

As will be apparent, computer control systems can be used in place of the sensors 15 to coordinate and control the movement of the heliostats 11.

The paper honeycomb panels 13a–13e have been shown in tests to provide quite strong and rigid supports. As will be apparent, paper honeycomb materials as well as other materials can be substituted for the galvanized pipe yoke structures to further reduce the cost of the heliostats.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. An adjustable curvature reflector for solar-thermal power systems, comprising in combination:
   a. a support structure;
   b. a panel structure overlying portions of said support structure, said panel structure including first and second sheets of material positioned in uniformly spaced relationship to define the thickness of said panel structure, and a cellular core of uniform thickness interposed between and bonded to said first and second sheets, said core being formed from strips of material positioned in side-by-side relationship and bonded together at spaced intervals to define an array of open-ended cells closed at opposite ends by said sheets;
   c. reflective means secured to said panel structure and defining a reflective surface;
   d. mounting means including a plurality of elongate members each having one end region connected to one of said structures and having the other end region extending through the other of said structures for mounting said panel structure on said support structure; and,
   e. fastening means interposed between said mounting means and said other structure to adjustably position said mounting means relative to said other structure for deforming portions of said panel structure to selectively adjust and retain a desired curvature of said reflective surface.

2. The apparatus of Claim 1 wherein:
   a. said mounting means includes a plurality of rods each having a threaded end region extending through said other structure; and
   b. said fastening means includes threaded fasteners threaded onto said threaded end regions and adapted to engage said other structure to move said rods through said other structure as required to deform said panel structure to obtain the desired curvature of said reflective surface.

3. The apparatus of claim 2 wherein:
   a. said support structure includes a plurality of support members extending generally parallel to each other;
   b. said panel structure extends across said support members; and
   said rods support said panel structure from said support members.

4. The apparatus of claim 3 wherein said threaded end regions extend through said panel structure and said fasteners include nuts threaded onto said threaded end regions on opposite sides of said panel structure.

5. The apparatus of claim 1 wherein said sheets comprise paper and said cellular core material is adhesively bonded to said sheets to provide an adhesively bonded assembly with one of said sheets defining a mounting surface for said reflective means.

6. The apparatus of claim 5 wherein said core is an expanded honeycomb paper core formed from strips of paper positioned in side-by-side relationship and adhered together at spaced intervals to define an array of open-ended cells closed at opposite ends by said sheets.

7. A heliostat comprising:
   a. an upstanding yoke;
   b. a support structure movably carried by said yoke and defining a plurality of spaced support members extending generally parallel to each other;
   c. a panel structure overlying said support members, said panel structure including first and second sheets of material positioned in uniformly spaced relationship to define the thickness of said panel structure, and a cellular core of uniform thickness interposed between and bonded to said first and second sheets, said core being formed from strips of material positioned in side-by-side relationship and bonded together at spaced intervals to define an array of open-ended cells closed at opposite ends by said sheets;
   d. reflective means secured to said panel structure and defining a reflective surface;
   e. mounting means having one end region secured to one of said structures and having the other end region extending through portions of said other structure for mounting said panel structure on said support structure; and,
   f. fastening means adjustably positioned on said mounting means and engageable with said portions of said other structure for moving said panel structure relatively toward and away from said support structure to selectively adjust and retain a desired curvature of said reflective surface by deflecting portions of said panel structure.

8. The heliostat of claim 7 wherein:
   a. said mounting means includes a plurality of rods each having a threaded end region extending through said other structure; and
   b. said fastening means includes threaded fasteners threaded onto said threaded end regions and adapted to engage said other structure to move said rods through said other structure as required to deform said panel structure to obtain the desired curvature of said reflective surface.

9. The heliostat of claim 8 wherein said threaded end regions extend through said panel structure and said fasteners include nuts threaded onto said threaded end regions on opposite sides of said panel structure.

10. The heliostat of claim 7 wherein said sheets comprise paper and said cellular core material is adhesively bonded to said sheets to provide an adhesively bonded assembly with one of said sheets defining a mounting surface for said reflective means.

11. The heliostat of claim 10 wherein said core is an expanded honeycomb paper core formed from strips of paper positioned in side-by-side relationship and adhered together at spaced intervals to define an array of open-ended cells closed at opposite ends by said sheets.

12. In a solar-thermal power system of the type including a plurality of heliostats arranged to direct the sun's rays toward a collector, the improved heliostat construction comprising in combination:
  a. a support structure;
  b. a panel structure positioned to overlie portions of said support structure, said panel structure including first and second sheets of material positioned in uniformly spaced relationship to define the thickness of said panel structure, and a cellular core of uniform thickness interposed between and bonded to said first and second sheets, said core being formed from strips of material positioned in side-by-side relationship and bonded together at spaced intervals to define an array of open-ended cells closed at opposite ends by said sheets;
  c. reflective means carried on said panel means on the side opposite said support structure portions and defining a reflective surface;
  d. adjustable mounting means for mounting said panel structure on said support structure portions and being adjustable for deforming portions of said panel structure to selectively adjust and retain a desired curvature of said reflective surface.

13. The heliostat of claim 12 wherein:
  a. said core is formed from paper;
  b. said sheets comprise paper facing sheets adhered to opposite sides of said core; and,
  c. said mounting means includes a plurality of rods having threaded end regions extending through said panel structure.

14. The heliostat of claim 12 wherein apertured gusset plates receive said threaded end regions on opposite sides of said panel structure, and nuts threaded onto said threaded end regions clamp said panel structure between said gusset plates.

15. A heliostat comprising:
  a. an upstanding yoke;
  b. a support structure movably carried by said yoke and defining a plurality of spaced support members extending generally parallel to each other;
  c. a panel structure including a plurality of panels positioned in side-by-side relationship and extending across said support members to define a substantially contiguous mounting surface on the side opposite said support members, each of said panels including first and second sheets of material positioned in uniformly spaced relationship to define the thickness of said panel structure, and a cellular core of uniform thickness interposed between and bonded to said first and second sheets, said core being formed from strips of material positioned in side-by-side relationship and bonded together at spaced intervals to define an array of open-ended cells closed at opposite ends by said sheets;
  d. reflective means secured to said mounting surface and defining a substantially contiguous reflective surface;
  e. adjustable mounting means mounting said panels on said support members and being adjustable for deforming said panels to selectively adjust and retain a desired curvature of said reflective surface.

16. The heliostat of claim 15 wherein:
  a. said mounting means includes a plurality of rods each having a threaded end region extending through said panel structure and having the other end region connected to said support structure; and
  b. threaded fasteners are threaded onto said threaded end regions and to position said panel structure at selected locations along said rods.

17. The heliostat of claim 16 wherein:
  a. each of said sheets is a sheet of paper and said cellular core is adhesively bonded to said sheets to provide an adhesively bonded assembly with one of said sheets defining a mounting surface for said reflective means;
  b. apertured gusset plates receive said threaded end regions on opposite sides of said panel structure; and,
  c. said threaded fasteners are operative to clamp said panels between said gusset plates.

18. In a heliostat of the type including a support structure and a panel structure carrying a reflective material and overlying portions of said support structure wherein said panel structure includes first and second sheets of material positioned in uniformly spaced relationship to define the thickness of said panel structure, and a cellular core of uniform thickness interposed between and bonded to said first and second sheets, said core being formed from strips of material positioned in side-by-side relationship and bonded together at spaced intervals to define an array of open-ended cells closed at opposite ends by said sheets, the improvement of an adjustable mounting system for mounting the panel structure on the support structure and for adjusting the curvature of said panel structure, comprising at least one threaded rod extending through at least one of said structures and having fastening means threaded onto said rod for engaging said one structure to selectively move portions of said panel structure toward and away from said support structure whereby the curvature of said panel structure is selectively adjustable.

19. A method for adjusting the curvature of a solar thermal reflector structure of the type including first and second sheets of material positioned in uniformly spaced relationship to define the thickness of said panel structure, and a cellular core of uniform thickness interposed between and bonded to said first and second sheets, said core being formed from strips of material positioned in side-by-side relationship and bonded together at spaced intervals to define an array of open-ended cells closed at opposite ends by said sheets to fine-tune its focus on the collector, comprising the steps of:
  a. providing a rod which connects at one end region with portions of the reflector structure and at the other end region with portions of the support structure with one of said end regions being threaded to receive a threaded fastener for selectively adjusting the position of said rod relative to its associated structure; and
  b. selectively adjusting the position of said threaded fastener to move said panel structure portions toward or away from said support structure as is required to adjust and retain a desired curvature of said reflector structure.

20. A lightweight curved reflector for a solar-thermal power system, comprising:
  a. a bonded panel assembly defining a curved mounting surface;

b. a reflective material carried on said mounting surface for support and being operable to reflect incident solar radiation;

c. said panel assembly including first and second sheets of material positioned in uniformly spaced relationship to define the thickness of said panel assembly, and a cellular core of uniform thickness interposed between and bonded to said first and second sheets, said core being formed from strips of material positioned in side-by-side relationship and bonded together at spaced intervals to define an array of open ended cells extending laterally between said sheets and being closed at opposite ends by said sheets.

21. The reflector of claim 20 wherein said sheets are thicker than said paper strips by a multiplication factor within the range of about 2 to 5.

22. The reflector of claim 21 wherein said cells are substantially uniform in cross-sectional area, and the length of said cells is within the range of about 2 to 10 times the square root of said cross-sectional area.

23. The reflector of claim 22 wherein:
a. said sheets are formed from paper having a thickness of about 0.025 inch; and,
b. said strips are formed from paper having a thickness of about 0.008 inch.

24. The reflector of claim 23 wherein:
a. said cell length is about 4 inches; and,
b. said cell cross-sectional area is about 1 square inch.

25. The reflector of claim 20 wherein said reflective panel is reinforced by a glass fiber cloth extending across and adhered to portions of said outer surfaces.

26. The reflector of claim 25 wherein said glass fiber cloth extends fully around said outer surfaces.

27. A lightweight reflector for solar-thermal power systems, comprising:
a. a waterproof adhesively bonded panel assembly formed from paper and defining a mounting surface extending longitudinally of the panel;
b. a waterproof reflective material secured to said mounting surface by a waterproof adhesive and being operable to reflect incident solar radiation;
c. said panel assembly including first and second sheets of paper extending in uniformly spaced relationship to define the top and bottom of said panel, and a cellular paper core of uniform thickness interposed between and adhered to said first and second sheets, said core being formed from strips of paper positioned in side-by-side relationship and adhered together at spaced intervals to define an array of open-ended cells extending laterally between said sheets and closed at opposite ends by said sheets.

28. The reflector of claim 27 wherein at least one of said sheets has portions extending around the sides of said panel and into sealed overlapping engagement with portions of the other sheet.

29. The reflector of claim 28 wherein the outer surfaces of said sheets are coated with a waterproofing material to provide a sealed waterproof panel.

* * * * *